(12) United States Patent
Li (10) Patent No.: US 6,996,262 B2
(45) Date of Patent: Feb. 7, 2006

(54) METHOD AND APPARATUS OF SCORING AN ARTERIAL OBSTRUCTION

(75) Inventor: Jianying Li, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 595 days.

(21) Appl. No.: 10/151,510

(22) Filed: May 20, 2002

(65) Prior Publication Data

US 2003/0215124 A1 Nov. 20, 2003

(51) Int. Cl.
G06K 9/00 (2006.01)
A62B 5/02 (2006.01)
(52) U.S. Cl. .................. 382/131; 382/128; 600/485
(58) Field of Classification Search ............. 382/128, 382/130, 154; 600/485, 486, 407
See application file for complete search history.

(56) References Cited

U.S. PATENT DOCUMENTS

| | | | | |
|---|---|---|---|---|
| 5,239,591 | A * | 8/1993 | Ranganath | 382/128 |
| 6,381,350 | B1 * | 4/2002 | Klingensmith et al. | 382/128 |
| 6,424,732 | B1 * | 7/2002 | Shiffman et al. | 382/131 |
| 6,658,082 | B2 * | 12/2003 | Okumura et al. | 378/19 |
| 2002/0151825 | A1 * | 10/2002 | Rubenchik et al. | 601/2 |

OTHER PUBLICATIONS

Carr, et al., Evaluation of Subsecond Gated Helical CT for Quanitification of Coronary Artery Calcium and Comparison with Electron Beam CT, Apr. 2000, 915-921, vol. 174, American Roentgen Ray Society.

Optican, Robert J., Coronary Artery Calcifaction Scanning; Its Time Has Arrived, www.msit.com/news3.htm.

* cited by examiner

Primary Examiner—Daniel Miriam
Assistant Examiner—ONeal R. Mistry
(74) Attorney, Agent, or Firm—Ziolkowski Patent Solutions Group, SC; Michael A. Della Penna; Carl B. Horton (57) ABSTRACT

The present invention is directed to a method and apparatus of scoring an arterial obstruction. The present invention includes identifying a particular group of pixels corresponding to a calcified region of coronary artery of a patient and based on the satisfaction of a number of thresholds connectivity criteria, determining a calcification score of that calcified region as indicative of the patient's risk of cardiovascular disease including atherosclerosis, heart attack, heart failure, and stroke. The present invention further includes determining the scaling factor unique to a particular imaging slice of data to provide a value of calcium weight and volume that is indicative of the true obstruction and true volume of the calcified region.

29 Claims, 5 Drawing Sheets

METHOD AND APPARATUS OF SCORING AN ARTERIAL OBSTRUCTION

BACKGROUND OF THE INVENTION

The present invention relates generally to diagnostic imaging and, more particularly, to a method and apparatus of scoring an arterial obstruction.

Typically, in computed tomography (CT) imaging systems, an x-ray source emits a fan-shaped beam toward a subject or object, such as a patient or a piece of luggage. Hereinafter, the terms "subject" and "object" may be interchangeably used and shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom.

Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data processing system for image reconstruction.

Specifically, cardiac CT is particularly useful in assisting medical providers in assessing a patient's risk of cardiovascular disease, including heart attack, heart failure, and stroke. One particular implementation of cardiac CT is the detection of calcium deposits in the coronary arteries of medical patients. The presence of calcium is indicative of atherosclerosis, or hardening of the arteries. Assessing the calcification in coronary arteries is commonly referred to as coronary artery calcium scoring (CACS). While detection of calcium deposits in the arteries is helpful in determining a patient's risk of heart disease, other factors must be considered in conjunction with a calcification score including age, gender, cholesterol levels, history of heart disease, diabetes, high blood pressure, weight, physical inactivity, and cigarette smoking. No single test or examination can provide a complete and accurate profile of a patient's risk of cardiovascular disease, but determining a coronary artery calcification score does assist medical providers in determining a personalized assessment of a patient's risk of heart attack, heart failure, and/or stroke.

According to statistics released by Northwestern Memorial Hospital, every thirty-three seconds someone in the United States dies from cardiovascular disease. Cardiovascular disease, including heart attack, heart failure, and stroke continues to be the leading cause of death for men and women in America. Therefore, there is increasingly a need to accurately detect and assess calcium deposits in the patient's coronary arteries so as to minimize the risk of atherosclerosis with medicine, diet, and exercise. Current calcification scoring techniques are susceptible or greatly affected by limited image resolution such as in-plane image blurring and axial partial volume effect. As a result, the weight of the detected calcium region is estimated rather than accurately determined. Further, when determining the volume of these calcification regions, the estimated volumes are typically higher than the true volume of the calcium region thereby leading to inappropriate treatment plans.

Therefore, it would be desirable to design an apparatus and method of calcification scoring an arterial obstruction of a subject that more accurately reflects a true weight and/or volume of the arterial obstruction that is not greatly affected by limited image resolution.

BRIEF DESCRIPTION OF THE INVENTION

The present invention is a directed method and apparatus of calcification scoring an arterial obstruction overcoming the aforementioned drawbacks.

The present invention is directed to a method and apparatus of scoring an arterial obstruction. The present invention includes identifying a particular group of pixels corresponding to a calcified region of coronary artery of a patient and based on the satisfaction of a number of thresholds connectivity criteria, determining a calcification score of that calcified region as indicative of the patient's risk of cardiovascular disease including atherosclerosis, heart attack, heart failure, and stroke. The present invention further includes determining the scaling factor unique to a particular imaging slice of data to provide a value of calcium weight and/or volume that is indicative of the true weight and/or true volume of the calcified region.

Accordingly, a method of scoring an arterial obstruction is provided. The method includes the steps of acquiring images for a number of slices of a subject and determining a set of the images corresponding to an arterial obstruction. The method further includes the steps of determining a slice thickness for each image of the set and determining an area of the arterial obstruction on each image. The method also includes the step of determining a product of the slice thickness of each image in the area of the arterial obstruction for each image. Next, each determined product is modified by a scaling factor and then the modified products for the set of images are summed and a characteristic of the arterial obstruction is determined therefrom.

In accordance with another aspect of the present invention, a method of coronary artery calcification scoring comprises the steps of acquiring imaging data for a number of imaging slices of a patient and identifying a set of pixels of the imaging data corresponding to calcium in a coronary artery of the patient. The method further includes the steps of determining an area of the calcium in each imaging slice as well as determining a subset of pixels to be considered for calcification scoring. A thickness of each imaging slice is then determined and the area of the calcium of each imaging slice is then modified by a corresponding slice thickness. The method further includes the step of determining a volume of the calcium in each imaging slice therefrom and modifying each volume by a corresponding scaling factor. Next, the modified volumes are summed to determine a total volume of the calcium in the coronary artery of the patient.

In accordance with a further aspect of the present invention, a computer readable storage medium having a computer program stored thereon is provided and represents a set of instructions that when executed by a computer causes the computer to initiate a multi-slice scan of the subject and acquire imaging data of the subject for a number of imaging slices. The set of instructions further causes the computer to determine a portion of the imaging data corresponding to calcium and determine a maximum CT number of the portion. A maximum CT number for calcium in each imaging slice is then determined as is a quantification factor for each imaging slice. The quantification factor is determined from the maximum CT number for calcium in each imaging slice and the maximum CT number of the portion. The computer is then caused to determine an area of the calcium in each imaging slice and modify each area by a corresponding slice thickness. The set of instructions then causes the computer to determine a weighted sum of each imaging area modified by the corresponding slice thickness and the quantification factor.

In accordance with yet another aspect of the present invention, a radiation emitting imaging apparatus for acquiring imaging data of a subject and determining the calcification score from the imaging data is provided. The imaging apparatus includes a rotatable gantry having an opening therein to receive a subject to be scanned and a high frequency electromagnetic energy source configured to project high frequency electromagnetic energy toward the subject. A detector assembly is provided and configured to detect high frequency electromagnetic energy attenuated by the subject. The imaging apparatus further includes a data acquisition system connected to the detector assembly and configured to receive electrical signals therefrom indicative of a high frequency electromagnetic energy detected. The imaging apparatus further includes a computer programmed to generate a set of imaging data from the electrical signals and arranging the imaging data to correspond to a number of imaging slices wherein each imaging slice has a slice thickness. The computer is further programmed to determine a portion of the imaging data corresponding to calcium and determine a maximum CT number of the calcium. The computer is also programmed to determine a maximum CT number of the calcium in each imaging slice as well as determine an area of the calcium in each imaging slice. The computer is then programmed to modify each area by a slice thickness and a ratio of the maximum CT number of the calcium for that imaging slice and the maximum CT number of the calcium for all slices. The computer is then programmed to sum each modified area to determine a calcification score.

In accordance with a further aspect of the present invention, the CT imaging system includes means for acquiring imaging data of a coronary artery of a subject wherein the imaging data corresponds to a number of imaging slices. The imaging system further includes means for isolating a portion of the imaging data corresponding to a calcium obstruction from the coronary artery as well as means for determining a thickness of each imaging slice. The imaging system further includes means for determining an area of the calcium obstruction in each imaging slice as well as means for determining a maximum CT number of the calcium obstruction in each imaging slice. The CT system further includes a means for determining a maximum CT number of the entire calcium obstruction as well as means for weighting a product of the area of the calcium on each imaging slice and a thickness of each imaging slice by ratio of the maximum CT number of the calcium obstruction in each imaging slice and the maximum CT number of the entire calcium obstruction. The CT system further includes means for summing the weighted products.

Various other features, objects, and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The operating environment of the present invention is described with respect to a four-slice computed tomography (CT) system. However, it will be appreciated by those skilled in the art that the present invention is equally applicable for use with other multi-slice configurations. Moreover, the present invention will be described with respect to the detection and conversion of x-rays. However, one skilled in the art will further appreciate that the present invention is equally applicable for the detection and conversion of other high frequency electromagnetic energy. The present invention will be described with respect to a "third generation" CT scanner, but is equally applicable with other CT and radiography systems.

Figure 1:
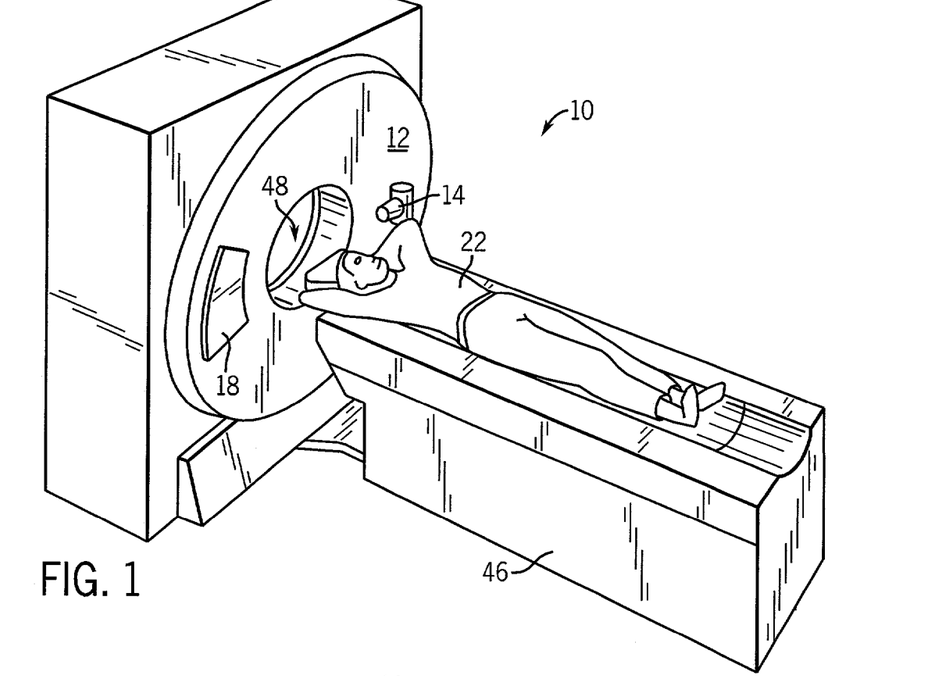
FIG. 1 is a pictorial view of a CT imaging system.
Figure 2:
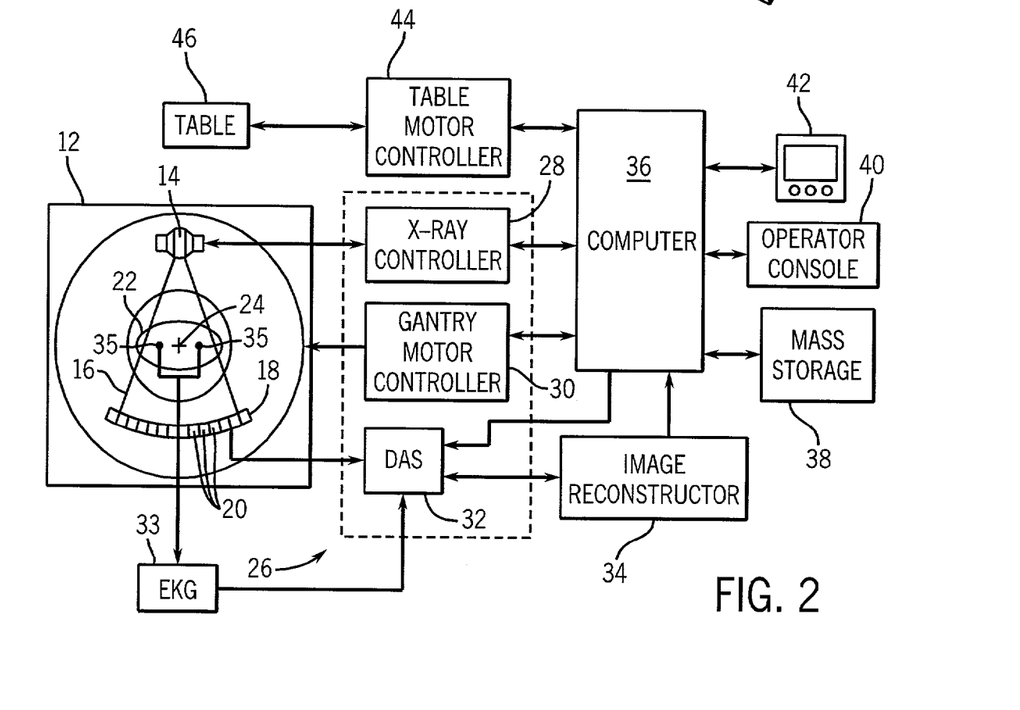
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of the gantry 12. Detector array 18 is formed by a plurality of detectors 20 which together sense the projected x-rays that pass through a medical patient 22. Each detector 20 produces an electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from detectors 20 and converts the data to digital signals for subsequent processing. An image reconstructor 34 receives sampled and digitized x-ray data from DAS 32 and performs high speed reconstruction. The reconstructed image is applied as an input to a computer 36 which stores the image in a obstruction storage device 38. For cardiac CT applications, the system 10 includes an EKG 33 connected to the subject via leads 35. The EKG 33 acquires motion signals corresponding to heartbeats of the subject which is used to correlate the acquired imaging data with the phases of the heart.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves portions of patient 22 through a gantry opening 48.

Figures 3, 4:
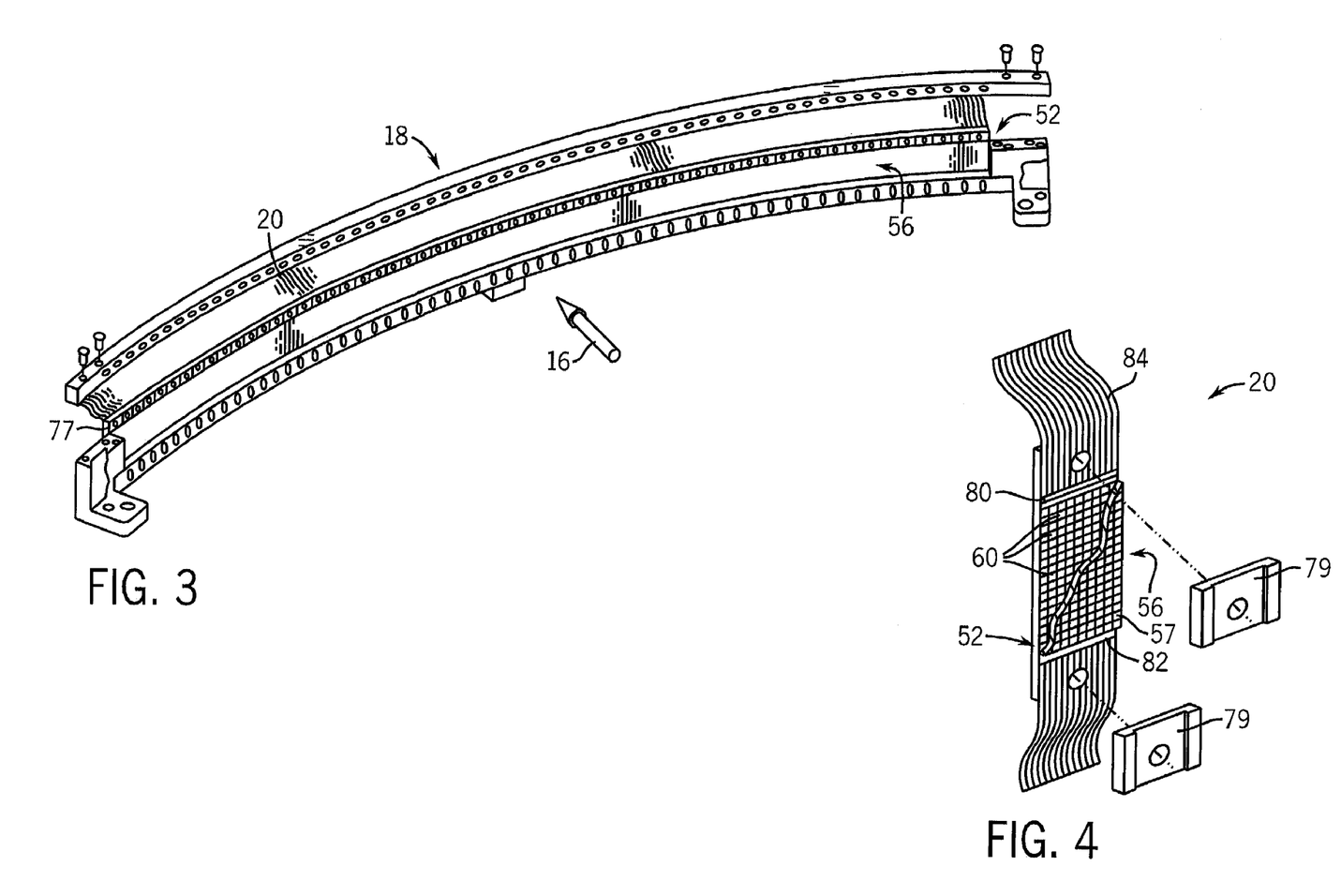
FIG. 3 is a perspective view of one embodiment of a CT system detector array.
FIG. 4 is a perspective view of one embodiment of a detector.

As shown in FIGS. 3 and 4, detector array 18 includes a plurality of scintillators 57 forming a scintillator array 56. A collimator (not shown) is positioned above scintillator array 56 to collimate x-ray beams 16 before such beams impinge upon scintillator array 56.

In one embodiment, shown in FIG. 3, detector array 18 includes 57 detectors 20, each detector 20 having an array size of 16×16. As a result, array 18 has 16 rows and 912 columns (16×57 detectors) which allows 16 simultaneous slices of data to be collected with each rotation of gantry 12.

Switch arrays 80 and 82, FIG. 4, are multi-dimensional semiconductor arrays coupled between scintillator array 56 and DAS 32. Switch arrays 80 and 82 include a plurality of field effect transistors (FET) (not shown) arranged as multi-dimensional array. The FET array includes a number of electrical leads connected to each of the respective photodiodes 60 and a number of output leads electrically connected to DAS 32 via a flexible electrical interface 84. Particularly, about one-half of photodiode outputs are electrically connected to switch 80 with the other one-half of photodiode outputs electrically connected to switch 82. Additionally, a reflector layer (not shown) may be interposed between each scintillator 57 to reduce light scattering from adjacent scintillators. Each detector 20 is secured to a detector frame 77, FIG. 3, by mounting brackets 79.

Switch arrays 80 and 82 further include a decoder (not shown) that enables, disables, or combines photodiode outputs in accordance with a desired number of slices and slice resolutions for each slice. Decoder, in one embodiment, is a decoder chip or a FET controller as known in the art. Decoder includes a plurality of output and control lines coupled to switch arrays 80 and 82 and DAS 32. In one embodiment defined as a 16 slice mode, decoder enables switch arrays 80 and 82 so that all rows of the photodiode array 52 are activated, resulting in 16 simultaneous slices of data for processing by DAS 32. Of course, many other slice combinations are possible. For example, decoder may also select from other slice modes, including one, two, and four-slice modes.

Figure 5:
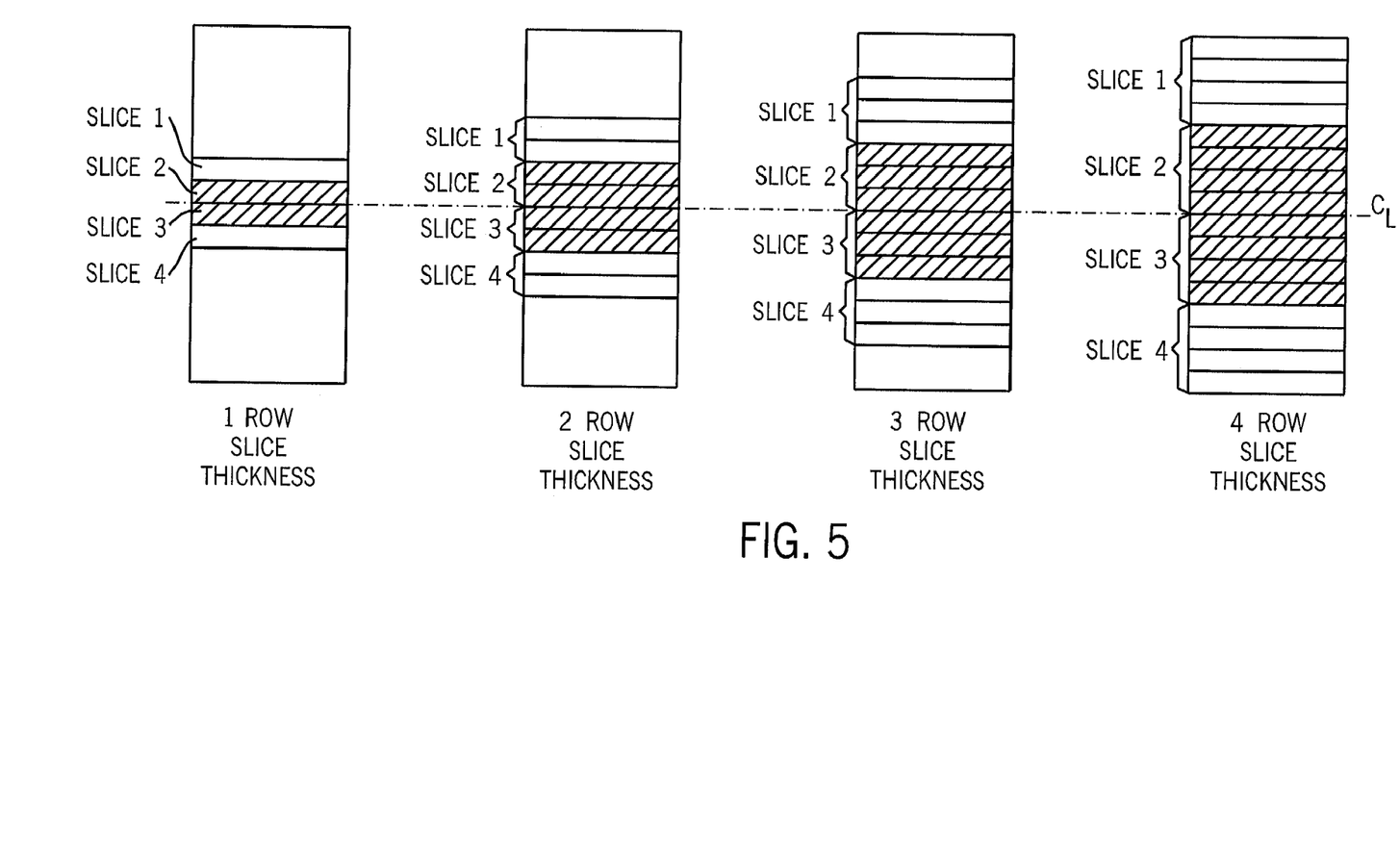
FIG. 5 is an illustrative of various configurations of the detector in FIG. 4 in a four-slice mode.

As shown in FIG. 5, by transmitting the appropriate decoder instructions, switch arrays 80 and 82 can be configured in the four-slice mode so that the data is collected from four slices of one or more rows of photodiode array 52. Depending upon the specific configuration of switch arrays 80 and 82, various combinations of photodiodes 60 can be enabled, disabled, or combined so that the slice thickness may consist of one, two, three, or four rows of scintillator array elements 57. Additional examples include, a single slice mode including one slice with slices ranging from 1.25 mm thick to 20 mm thick, and a two slice mode including two slices with slices ranging from 1.25 mm thick to 10 mm thick. Additional modes beyond those described are contemplated.

The present invention farther includes a method of determining a coronary arterial calcification score for a region of calcium detected in a coronary artery of a patient. The present invention will be described with respect to determining both a calcium weight as well as a calcium volume but the present invention should not be construed as being limited to the determination of both the calcium weight and calcium volume. That is, a weight of a calcified region of a coronary artery may be determined independent of determining a volume of the same calcified region and vice-versa.

Figure 6:
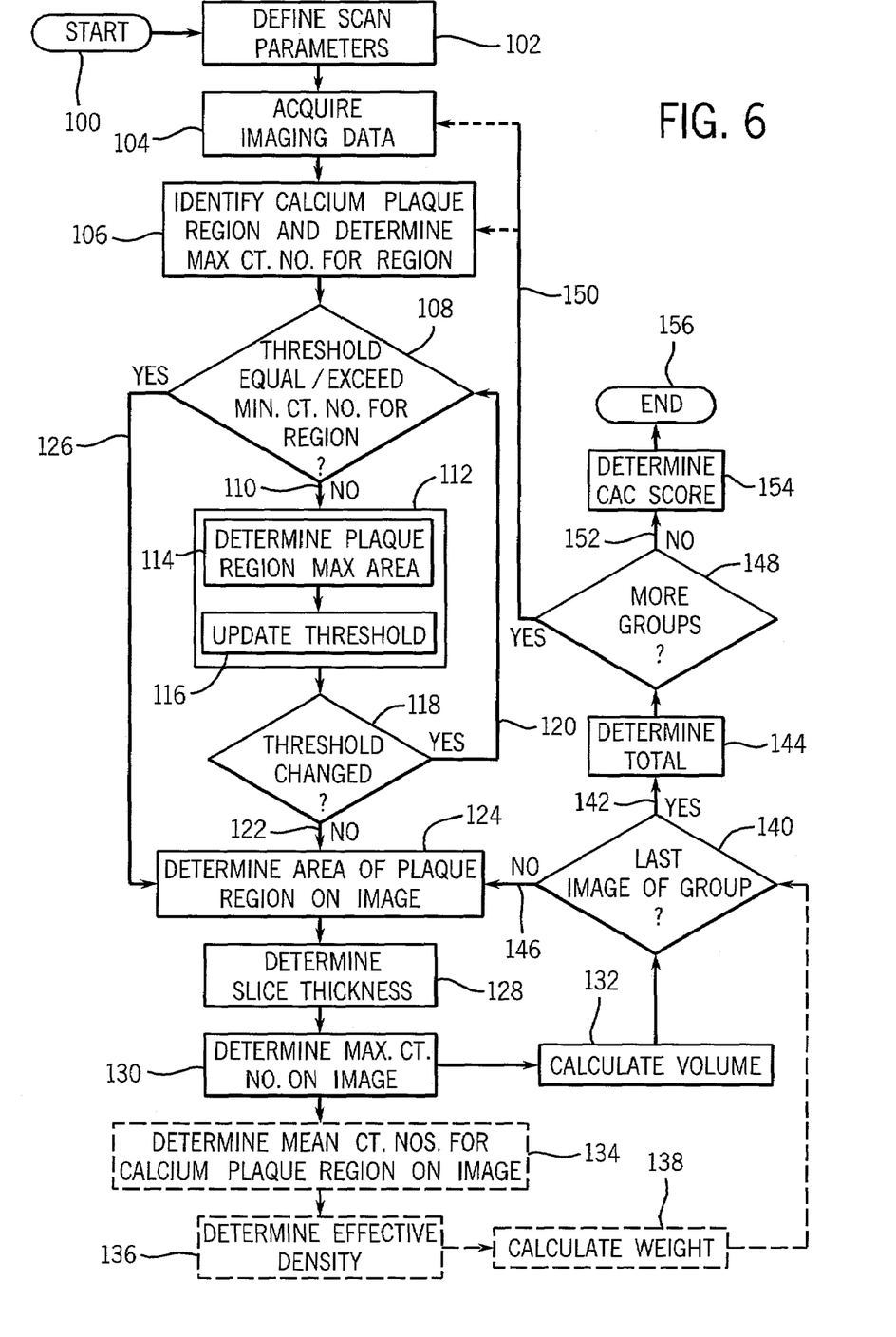
FIG. 6 is a flow chart setting forth the steps of a process for scoring an arterial obstruction of a subject in accordance with the present invention.

Referring now to FIG. 6, the steps of determining a coronary artery calcification score will be described with respect to a process that may be equivalently carried out as a method or as executed by a computer or microprocessor pursuant to instructions of a computer program. The process begins at 100 with the preparation of the patient for scanning including, but not limited to placement of the patient in a scanning bay and attaching the requisite leads to the patient for acquiring cardiac CT data. The examiner/radiologist then defines the scan parameters for the acquisition of data at 102. Those parameters include identifying an anatomical region of the patient for data acquisition such as a coronary or thorax region as well as setting a minimum CT number for that which is the subject of the cardiac CT session.

As is generally well known, bone, tissue, muscle, etc. of a patient have a unique CT number. For example, the minimum CT number often associated with calcium in a coronary artery is 130 when 120 kVp is used to generate the X-rays.

Once the parameters and protocol requiring imaging data of the subject have been prescribed 102, CT data is acquired of the patient at 104. Following the acquisition of imaging data pursuant to one of a number of known imaging techniques, a calcium plaque region is identified based on the minimum CT number established at 102. A maximum CT number for the identified region is then determined at 106. The identification of a calcium plaque region for scoring, in accordance with the present invention, prefers that the pixels associated with the identified calcium plaque region not only exceed the minimum or threshold CT number established at 102 but that the pixels also satisfy a set of connectivity criteria.

The set of connectivity criteria requires that the pixels corresponding to the calcium region to be scored must be adjacent to one another or "clustered". The connectivity criteria may be established at 102 with the establishment of the scan parameters or may also be established after the acquisition of the imaging data at 104. The connectivity criteria may be varied depending upon the needs of a particular scoring session and as such vary the number of pixels that must be clustered together to satisfy the minimum connectivity requirements. For example, in one application it may be sufficient that two pixels be connected or adjacent to one another whereas another application may require six pixels be clustered for the calcium corresponding to that cluster of pixels to be considered for scoring. By requiring satisfaction of a set of connectivity criteria, the present invention helps eliminate the inaccuracies of scoring typically associated with limited image resolution such as in-plane image blurring and axial partial volume effect. These inaccuracies are avoided by analyzing and scoring calcium that is in the same group (a same group being defined as in the same scoring category and in consecutive image slices).

CT numbers generally represent the density of a particular anatomical region that has been imaged. For example, calcium has a higher CT number than tissue. Therefore, based on CT number alone a calcium region or calcium deposits in a coronary artery of a patient may be readily identified. However, the minimum CT number established at 102 may exceed the CT number of the calcium region identified in the particular patient image thereby leading to an inaccurate assessment of the patient's risk of cardiovascular disease. Therefore at 108, a determination is made as to whether the threshold CT number established at 102 exceeds a minimum CT number for the identified calcium plaque region. If the answer is NO 110, the calcium plaque region to be considered for scoring is redefined at 112.

The steps for redefining the calcium plaque region for scoring include determining a plaque region maximum area 114 and updating the threshold based on the determined maximum area at 116. Updating the threshold 116 requires a comparison of the maximum area determined at 114 with a medium-sized area which is typically 100 sq. mm. Typically, calcium deposit regions are classified into two groups based on the maximum area determined for the identified calcium region with respect to the typical medium-sized area of 100 sq. mm. As the following tables indicate, the determination is first made as to whether the maximum area of the plaque region exceeds 100 sq. mm. Once that determination is made, the appropriate table of values is considered and the appropriate threshold value is determined based on the maximum CT number for the group of pixels determined at 106. For example, for a calcium region having an area less than 100 sq. mm. and a maximum CT number for the group of pixels exceeding 401, the appropriate threshold is 145 whereas a maximum CT number for the group of pixels exceeding 301 but less than 400 for the same area of calcium, the threshold should be 140. The values set forth in the tables are representative of a particular imaging protocol and should not be construed as limiting the applicability of the present invention to only those values.

TABLE 1

For $A_{max} < A_t = 100$ mm$^2$:

| Maximum CT number in the group | Threshold ($T_g$) |
|---|---|
| $G_{max} < 300$ | 130 |
| $301 < G_{max} < 400$ | 140 |
| $G_{max} > 401$ | 145 |

TABLE 2

For $A_{max} >= A_t = 100$ mm$^2$:

| Maximum CT number in the group | Threshold ($T_g$) |
|---|---|
| $G_{max} < 300$ | 120 |
| $301 < G_{max} < 400$ | 130 |
| $G_{max} > 401$ | 140 |

Following updating the threshold at 116, a determination is made at 118 as to whether the threshold value has in fact changed. If YES 120, the process returns to step 108 to determine if the updated threshold exceeds the minimum CT number for the region. If the threshold value has not changed 122, the area of the plaque region on a particular image is determined at 124. This is distinguished from the maximum plaque region area determined at 114 in that at 114, the area of the plaque region for all images of an image set is determined whereas at 124, the area of a plaque region for one image slice of the image set is determined. Also, if at 108, the threshold value is determined to equal or exceed the minimum CT number for the region 126, the process continues to step 124. At 128, a slice thickness is determined. Typically, the slice thickness is defined during the establishment of the scan parameters at 102 and thus a determination of the slice thickness at 128 may include accessing a user defined parameter stored in memory at 102. However, the present invention contemplates a determination to slice thickness after the acquisition of imaging data.

Once the area of the plaque region on an image slice is determined 124 as well as the slice thickness 128, the maximum CT number on that image slice is determined at 130. After the maximum CT number on that image slice is determined at 130, the process has sufficient information to calculate or determine the volume of the calcium region for that particular image at 132. However, depending upon the particular requirements of the imaging session, the process may continue alternatively at 134 with a determination of the mean CT numbers for the calcium plaque region for the imaging slice. By determining the mean CT numbers, an effective density may be determined at 136. The effective density may be determined from a calibration curve stored in memory as a look-up table on the CT imager. The calibration curve is a relationship between CT number and calcium density. That is, based on the CT number for the imaging slice, an effective calcium density can be determined. In one embodiment, the effective density may be defined as follows:

$$D_i(G/cm^3) = a + b * N_{ct} \qquad \text{Eqn. 1}$$

wherein $N_{ct}$ is the mean CT number of the calcium for the imaging slice, a and b are pre-determined constants and the $D_i$ is the effective calcium density. The effective density determined at 136 is then used in conjunction with the slice thickness and area of calcium plaque on that image slice to determine or calculate the weight of the calcium plaque region for that image slice 138.

The determination of volume at 132 or the determination of weight at 138 includes the determination of a calibration or scaling factor. The scaling factor is a ratio of the maximum CT number for that image determined at 130 and the maximum CT number identified for the group of pixels corresponding to the identified calcium plaque region 106.

After the volume is determined for that particular image 132 or, alternatively, the weight 138, a determination is made at 140 as to whether additional images of the image set are to be evaluated. If the last image has been evaluated 142, the process continues to 144. If the last image has not been evaluated 140, 146, the process returns to step 124 with the determination of plaque region area on the next image slice. The process then continues through steps 128–138 to determine a volume or, alternatively, the weight of the calcified region for the new image slice.

At 144, a total volume or a total weight of the identified calcium region across all image slices is determined. The total volume is determined according to the following equation:

$$V = \sum_i \frac{I_{max_i}}{G_{max}} \cdot A_i \cdot S_t; \qquad \text{Eqn. 2}$$

where V equals the total volume of the calcium, i represents a particular imaging slice, $I_{max_i}$ equals the maximum CT number of the calcium for the imaging slice, $G_{max}$ equals the maximum CT number of the calcium for the group of pixels, $A_i$ equals the area of the calcium on the imaging slice, and $S_t$ equals the slice thickness of the imaging slice. The total weight of the calcium plaque region may be determined by the following equation:

$$W = \sum_i \frac{I_{max_i}}{G_{max}} A_i \cdot D_i \cdot S_t; \qquad \text{Eqn. 3}$$

where W equals a total weight of the calcium region and $D_i$ equals an effective density of calcium in a particular imaging slice.

$$\frac{I_{max_i}}{G_{max}}$$

represents a calibration or scaling factor heretofore described.

Once the total volume or total weight is determined at 144, the process continues to determine if additional groups of pixels are to be evaluated at 148. If YES 148, 150, the process returns to either step 104 with the acquisition of additional imaging date or step 106 with the identification of another group of pixels. If NO 148, 152, the process determines a calcification score at 154 using either the true volume or true weight as determined at 144. The process then ends at 156.

Figure 7:
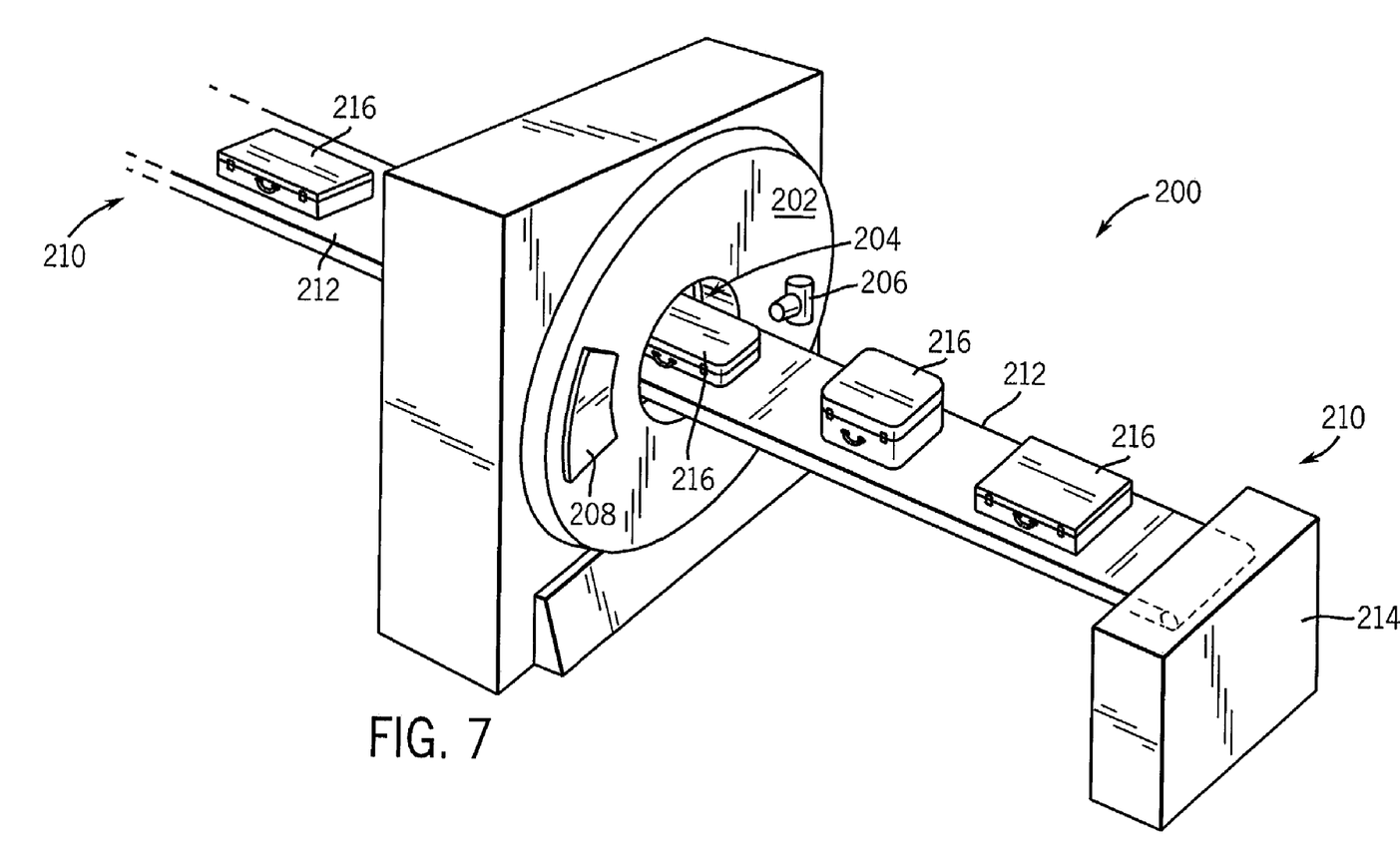
FIG. 7 is a pictorial view of a CT system for use with a non-invasive package inspection system incorporating the present invention.

Referring now to FIG. 7, package/baggage inspection system 200 incorporating the algorithm of FIG. 6 is shown. The algorithm may be implemented with such an inspection system to determine a true weight and/or volume of content of a package. As CT numbers are indicative of density, the present invention may be applicable in assisting inspectors in identifying particular objects based on CT number. The inspection system includes a rotatable gantry 202 having an opening 204 therein through which packages or pieces of baggage may pass. The rotatable gantry 202 houses a high frequency electromagnetic energy source 206 as well as a detector assembly 208 having scintillator arrays comprised of scintillator cells. A conveyor system 210 is also provided and includes a conveyor belt 212 supported by structure 214 to automatically and continuously pass packages or baggage pieces 216 through opening 204 to be scanned. Objects 216 are fed through opening 204 by conveyor belt 212, imaging data is then acquired, and the conveyor belt 212 removes the packages 216 from opening 204 in a controlled and continuous manner. As a result, postal inspectors, baggage handlers, and other security personnel may non-invasively inspect the contents of packages 216 for explosives, knives, guns, contraband, etc.

In accordance with one embodiment of the present invention a method of scoring an arterial obstruction is provided. The method includes the steps of acquiring images for a number of slices of a subject and determining a set of the images corresponding to an arterial obstruction. The method further includes the steps of determining a slice thickness for each image of the set and determining an area of the arterial obstruction on each image. The method also includes the step of determining a product of the slice thickness of each image in the area of the arterial obstruction for each image. Next, each determined product is modified by a scaling factor and then the modified products for the set of images are summed and a characteristic of the arterial obstruction is determined therefrom.

In accordance with another embodiment of the present invention, a method of coronary artery calcification scoring comprises the steps of acquiring CT imaging data for a number of imaging slices of a patient and identifying a set of pixels of the CT imaging data corresponding to calcium in a coronary artery of the patient. The method further includes the steps of determining an area of the calcium in each imaging slice as well as determining a subset of pixels to be considered for calcification scoring. A thickness of each imaging slice is then determined and the area of the calcium of each imaging slice is then modified by a corresponding slice thickness. The method further includes the step of determining a volume of the calcium in each imaging slice therefrom and modifying each volume by a corresponding calcification factor. Next, the modified volumes are summed to determine a total volume of the calcium in the coronary artery of the patient.

In accordance with a further embodiment of the present invention, a computer readable storage medium having a computer program stored thereon is provided and represents a set of instructions that when executed by a computer causes the computer to initiate a multi-slice scan of the subject and acquire imaging data of the subject for a number of imaging slices. The set of instructions further causes the computer to determine a portion of the imaging data corresponding to calcium and determine a maximum CT number of the portion. A maximum CT number for calcium in each imaging slice is then determined as is a quantification factor for each imaging slice. The quantification factor is determined from the maximum CT number for calcium in each imaging slice and the maximum CT number of the portion. The computer is then caused to determine an area of the calcium in each imaging slice and modify each area by a corresponding slice thickness. The set of instructions then causes the computer to determine a weighted sum of each imaging area modified by the corresponding slice thickness and the quantification factor.

In accordance with yet another embodiment of the present invention, a radiation emitting imaging apparatus for acquiring imaging data of a subject and determining the calcification score from the imaging data is provided. The imaging apparatus includes a rotatable gantry having an opening therein to receive a subject to be scanned and a high frequency electromagnetic energy source configured to project high frequency electromagnetic energy toward the subject. A detector assembly is provided and configured to detect high frequency electromagnetic energy attenuated by the subject. The imaging apparatus further includes a data acquisition system connected to the detector assembly and configured to receive electrical signals therefrom indicative of a high frequency electromagnetic energy detected. The imaging apparatus further includes a computer programmed to generate a set of imaging data from the electrical signals and arranging the imaging data to correspond to a number of imaging slices wherein each imaging slice has a slice thickness. The computer is further programmed to determine a portion of the imaging data corresponding to calcium and determine a maximum CT number of the calcium. The computer is also programmed to determine a maximum CT number of the calcium in each imaging slice as well as determine an area of the calcium in each imaging slice. The computer is then programmed to modify each area by a slice thickness and a ratio of the maximum CT number of the calcium for that imaging slice and the maximum CT number of the calcium for all slices. The computer is then programmed to sum each modified area to determine a calcification score.

In accordance with a further embodiment of the present invention, the CT imaging system includes means for acquiring imaging data of a coronary artery of a subject wherein the imaging data corresponds to a number of imaging slices. The imaging system further includes means for isolating a portion of the imaging data corresponding to a calcium obstruction from the coronary artery as well as means for determining a thickness of each imaging slice. The imaging system further includes means for determining an area of the calcium obstruction in each imaging slice as well as means determining a maximum CT number of the calcium obstruction in each imaging slice. The CT system further includes a means for determining a maximum CT number of the entire calcium obstruction as well as means for weighting a product of the area of the calcium on each imaging slice and a thickness of each imaging slice by ratio of the maximum CT number of the calcium obstruction in each imaging slice and the maximum CT number of the entire calcium obstruction. The CT system further includes means for summing the weighted products.

The present invention has been described in terms of the preferred embodiment, and it is recognized that equivalents, alternatives, and modifications, aside from those expressly stated, are possible and within the scope of the appending claims.

What is claims is:

1. A method of scoring an arterial obstruction comprising the steps of:
   acquiring images for a number of slices of a subject;
   determining a set of the images corresponding to an arterial obstruction that contains calcium;
   determining a slice thickness for each image of the set;
   determining an area of the arterial obstruction on each image;
   determining a product of the slice thickness of each image and the area of the arterial obstruction of each image;
   modifying each product by a scaling factor;
   summing the modified products for the set of images; and
   determining a characteristic of the arterial obstruction therefrom.

2. The method of claim 1 further comprising the step of determining a volume of the arterial obstruction.

3. The method of claim 1 further comprising the step of modifying each product by an effective density of each image and summing the modified products and determining a weight of the arterial obstruction therefrom.

4. The method of claim 3 further comprising the step of determining the effective density of each image from a calibration curve.

5. The method of claim 4 further comprising the step of determining the effective density of each image by determining a relationship between obstruction density and mean CT number of the calcium.

6. The method of claim 1 wherein the scaling factor for each image includes a ratio of maximum CT number for the arterial obstruction on each image and maximum CT number for the arterial obstruction on all images.

7. The method of claim 1 wherein the arterial obstruction includes a region of calcium in a coronary artery of the subject.

8. A method of coronary artery calcification scoring comprising the steps of:
   (A) acquiring imaging data for a number of imaging slices of a patient;
   (B) identifying a set of pixels of the imaging data corresponding to calcium in a coronary artery of the patient;
   (C) determining an area of the calcium in each imaging slice;
   (D) determining a subset of pixels to be considered for calcification scoring;
   (E) determining a thickness of each imaging slice;
   (F) modifying the area of the calcium of each imaging slice by a corresponding slice thickness and determining a volume of the calcium in each imaging slice therefrom;
   (G) modifying each volume by a corresponding calibration factor for each imaging slice; and
   (H) summing the modified volumes to determine a total volume of the calcium in the coronary artery of the patient.

9. The method of claim 8 wherein the imaging data is CT imaging data and further comprising the steps of:
   determining a maximum CT number for the subset of pixels;
   determining a maximum CT number for each imaging slice; and
   determining the corresponding calibration factor for each imaging slice from the maximum CT number for the subset of pixels and the maximum CT number for each imaging slice.

10. The method of claim 9 wherein the calibration factor for each imaging slice includes a ratio of the maximum CT number for the subset of pixels and the maximum CT number for each imaging slice.

11. The method of claim 10 wherein the ratio includes $$\frac{I_{max_i}}{G_{max}};$$

where $I_{max_i}$ equals the maximum CT number of the calcium for an imaging slice and $G_{max}$ equals the maximum CT number of the calcium for the subset of pixels.

12. The method of claim 11 wherein $$V = \sum_i \frac{I_{max_i}}{G_{max}} A_i S_t;$$

where:
   V equals the total volume of the calcium;
   i represents a particular imaging slice;
   $I_{max_i}$ equals the maximum CT number of the calcium for an imaging slice;
   $G_{max}$ equals the maximum CT number of the calcium for the subset of pixel;
   $A_i$ equals the area of the calcium of an imaging slice; and
   $S_t$ equals the slice thickness of an imaging slice.

13. The method of claim 8 further comprising the step of determining an area threshold for the calcium and determining if the area of the calcium for each imaging slice exceeds a pre-determined area threshold and, if so, adjusting the area threshold.

14. The method of claim 13 further comprising the step of repeating steps (C)–(H) if the area of the calcium for each imaging slice exceeds the pre-determined area threshold.

15. The method of claim 8 further comprising the step of determining mean CT numbers for the calcium identified by the set of pixels and determining an effective density of each imaging slice from a calibration curve.

16. The method of claim 15 wherein the step of modifying the volumes includes the step of modifying each volume by a corresponding effective density $D_i$.

17. The method of claim 16 wherein:

$$W = \sum_i \frac{I_{max_i}}{G_{max}} \cdot A_i \cdot D_i \cdot S_t;$$

where:
W equals a total weight of the calcium;
i represents a particular imaging slice;
$I_{max_i}$ equals the maximum CT number of the calcium for an imaging slice;
$G_{max}$ equals the maximum CT number of the calcium for the subset of pixels;
$A_i$ equals the area of calcium of an imaging slice;
$S_t$ equals the slice thickness of an imaging slice; and
$D_i$ equals an effective density of calcium in an imaging slice.

18. The method of claim 15 wherein the calibration curve represents a relationship between effective calcium density and mean CT number of the calcium.

19. A computer readable storage medium having a computer program stored thereon and representing a set of instructions that when executed by a computer causes the computer to:
initiate a multi-slice scan of a subject;
acquire imaging data of the subject for a number of imaging slices;
determine a portion of the imaging data corresponding to calcium;
determine a maximum CT number of the portion;
determine a maximum CT number for calcium in each imaging slice;
determine a scaling factor for each imaging slice from the maximum CT number for calcium in each imaging slice and the maximum CT number of the portion;
determine an area of the calcium in each imaging slice;
modify each area by a corresponding slice thickness; and
determine a weighted sum of each imaging area modified by the corresponding slice thickness and the quantification factor.

20. The computer readable storage medium of claim 19 wherein the set of instructions further causes the computer to determine an effective density of the calcium of each imaging slice.

21. The computer readable storage medium of claim 20 wherein the set of instructions to determine a weighted sum includes instructions to modify each imaging area by a corresponding slice thickness, the scaling factor, and the effective density.

22. The computer readable storage medium of claim 20 wherein the set of instructions further causes the computer to determine the effective density from a calibration curve stored as a look-up table in memory of an imaging apparatus used to acquire the imaging data.

23. The computer readable storage medium of claim 20 wherein the set of instructions further causes the computer to determine a mean CT number of the calcium of each imaging slice.

24. A radiation emitting imaging apparatus for acquiring imaging data of a subject and for determining a calcification score from the imaging data, the radiation emitting imaging apparatus comprising;
a rotatable gantry having an opening therein to receive a subject to be scanned;
an HF electromagnetic energy source configured to project HF electromagnetic energy toward the subject;
a detector assembly configured to detect HF electromagnetic energy attenuated by the subject;
a data acquisition system connected to the detector assembly and configured to receive electrical signals from the detector assembly indicative of the HF electromagnetic energy detected; and
a computer programmed to:
generate a set of imaging data from die electrical signals;
arrange the imaging data to correspond to a number of imaging slices, each imaging slice having a slice thickness;
determining a portion of the imaging data corresponding to calcium;
determine a maximum CT number of the calcium;
determine a maximum CT number of the calcium in each imaging slice;
determine an area of the calcium in each imaging slice;
modify each area by a slice thickness and a ratio of the maximum CT number of the calcium for a corresponding imaging slice and the maximum CT number of the calcium; and
sum each modified area to determine a calcification score.

25. The radiation emitting imaging apparatus of claim 24 wherein the calcification score includes a volume of the calcium.

26. The radiation emitting imaging apparatus of claim 24 further comprising a look-up table and wherein the computer is further programmed to determine a mean CT number of the calcium in cach imaging slice and determine an effective density of the calcium in each imaging slice from the mean CT number and data stored on the look-up table.

27. The radiation emitting imaging apparatus of claim 25 wherein the computer is further programmed to modify each area by a slice thickness, an effective density, and a ratio of a corresponding maximum CT number for calcium and the maximum CT number of the calcium for cach imaging slice to determine a obstruction of the calcium.

28. A CT imaging system comprising:
means for acquiring imaging data of a coronary artery of a subject, the imaging data corresponding to a number of imaging slices;
means for isolating a portion of the imaging data corresponding to a calcium obstruction in the coronary artery;
means for determining a thickness of each imaging slice;
means for determining an area of the calcium obstruction in each imaging slice;
means for determining a maximum CT number of the calcium obstruction in each imaging slice;
means for determining a maximum CT number of the calcium obstruction;

means for weighting a product of the area of the calcium in each imaging slice and the thickness of each imaging slice by a ratio of the maximum CT number of the calcium obstruction in each imaging slice and the maximum CT number of the calcium obstruction; and
means for summing the weighted products.

29. A method of scoring an arterial obstruction comprising the steps of:

acquiring images for a number of slices of a subject;
determining a set of the images corresponding to an arterial obstruction;
determining a slice thickness for each image of the set;
determining an area of the arterial obstruction on each image;
determining an effective density of each image from a calibration curve by determining a relationship between arterial obstruction density and mean CT number of calcium;
determining a product of the slice thickness of each image and the area of the arterial obstruction of each image;
modifying each product by a sealing factor that includes modifying each product by the effective density of each image;
summing the modified products for the set of images; and
determining a characteristic of the arterial obstruction therefrom, wherein the characteristic includes a weight of the arterial obstruction.

* * * * *

UNITED STATES PATENT AND TRADEMARK OFFICE
CERTIFICATE OF CORRECTION

PATENT NO. : 6,996,262 B2
APPLICATION NO. : 10/151510
DATED : February 7, 2006
INVENTOR(S) : Li It is certified that error appears in the above-identified patent and that said Letters Patent is hereby corrected as shown below:

Col. 11, line 32, delete "claims" and substitute therefore -- claimed --;
Col. 11, line 63 (Claim 6), delete "cach" and substitute therefore -- each --;

Col. 12, line 50 (Claim 12), delete "$V = \sum_i \frac{I_{max_i}}{G_{max}} A_i S_t$" and substitute therefore -- $V = \sum_i \frac{I_{max_i}}{G_{max}} \bullet A_i \bullet S_t$ --;

Col. 12, line 59 (Claim 12), delete "pixel" and substitute therefore -- pixels --;
Col. 14, line 8 (Claim 24), delete ";" and substitute therefore -- : --;
Col. 14, line 20 (Claim 24), delete "die" and substitute therefore -- the --;
Col. 16, line 7 (Claim 29), delete "sealing" and substitute therefore -- scaling --.

Signed and Sealed this

Eleventh Day of July, 2006

JON W. DUDAS
*Director of the United States Patent and Trademark Office*